UNITED STATES PATENT OFFICE.

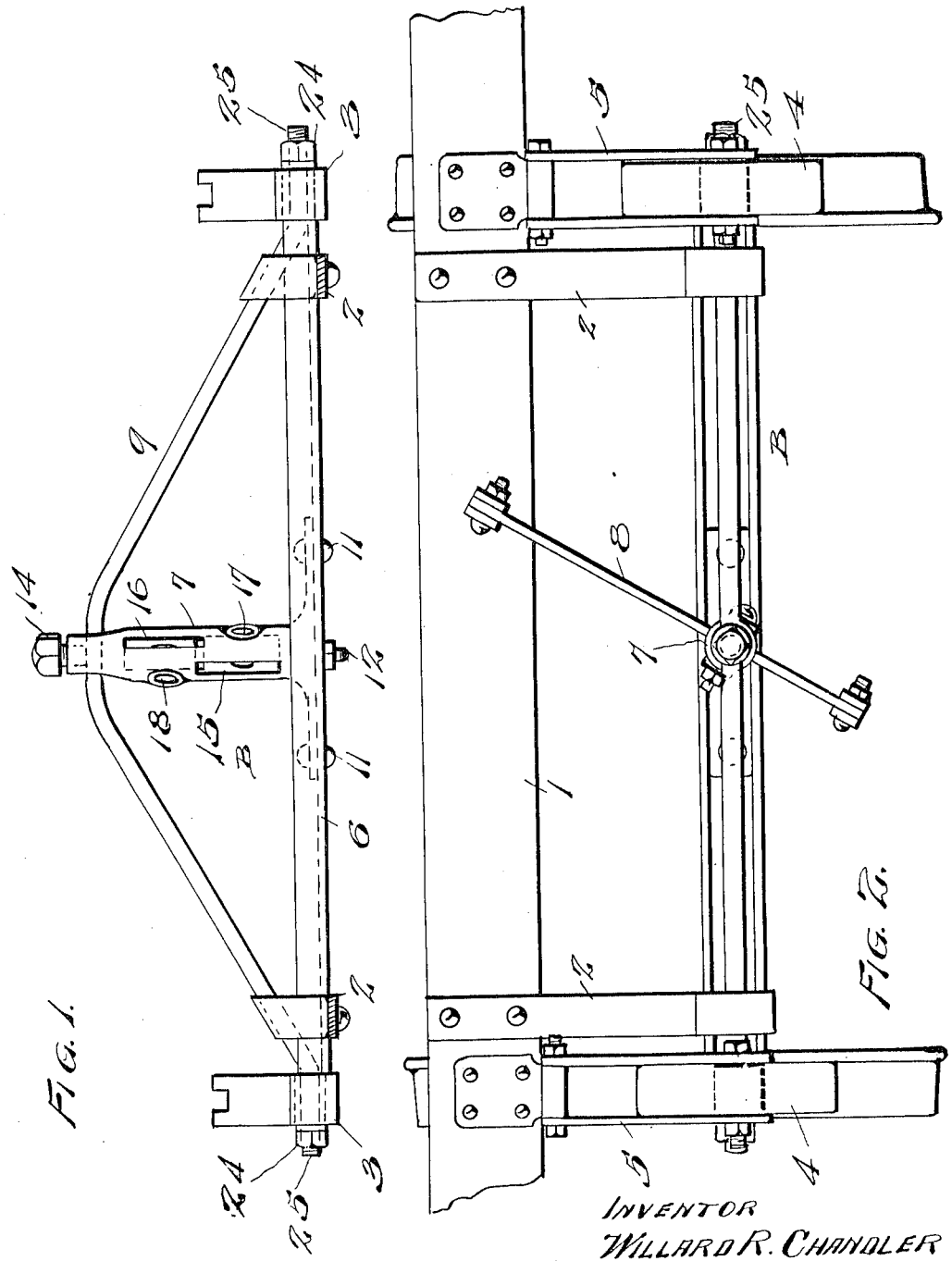

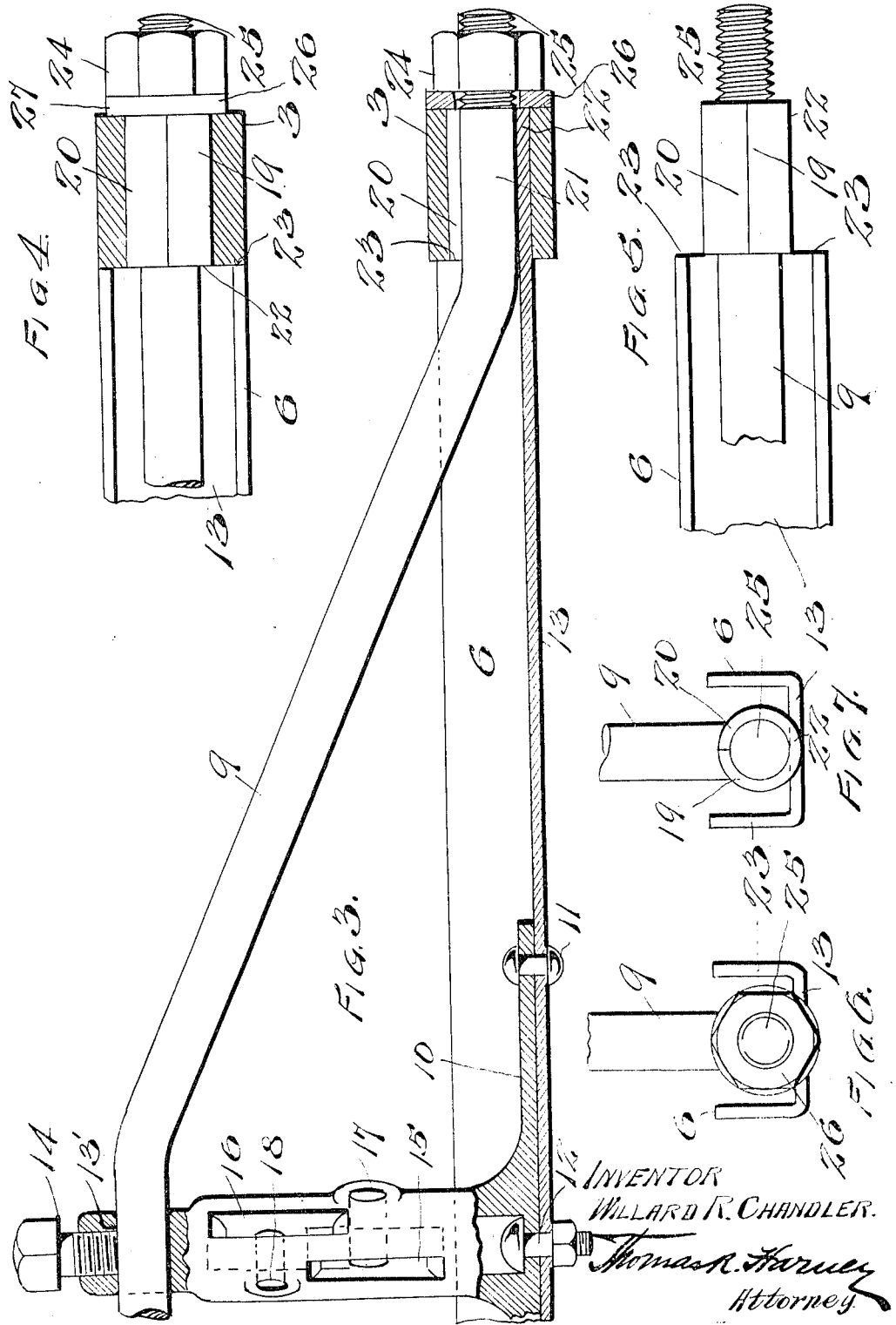

WILLARD R. CHANDLER, OF SUMTER, SOUTH CAROLINA.

BRAKE-BEAM.

1,313,982.  Specification of Letters Patent.  Patented Aug. 26, 1919.

Application filed December 21, 1918. Serial No. 267,786.

*To all whom it may concern:*

Be it known that I, WILLARD R. CHANDLER, a citizen of the United States of America, residing at Sumter, in the county of Sumter and State of South Carolina, have invented certain new and useful Improvements in Brake-Beams, of which the following is a specification.

The present invention relates to improvements in brake beams for railway cars, and is designed particularly for the purpose of providing a beam that is simple in construction, durable, well braced, and composed of a minimum of parts to insure a brake beam involving a minimum of weight and a maximum of strength. One of the primary objects of the invention is the provision of a beam that may be repaired while out on the railroad, without the necessity for turning the car into the shop, and with the aid of simple tools that are carried on the train, and to this end the strut forming the fulcrum for the brake levers is fashioned with right and left hand slots so that either a right hand lever or a left hand lever may be fitted to the beam when required.

In the accompanying drawings one complete example of the physical embodiment of the invention, as now in actual use on the railroads, is illustrated, the parts being constructed and arranged according to the best mode so far devised for the practical application of the principles of the invention.

Figure 1 is a top plan view of a beam involving the invention one pair of hanger straps being shown in section.

Fig. 2 is an end view of a truck showing the wearing faces of the brake shoes and one of the beams back of and supporting the brakes.

Fig. 3 is an enlarged plan view, partly in section, of a portion of the beam, showing one of the brake heads in section on the beam.

Fig. 4 is an edge view of one end of the beam showing the brake head in section and the securing nut on the bolt end of the truss rod or tension member of the beam.

Fig. 5 is a view similar to Fig. 4 but with the brake head and nut with its washer, omitted.

Fig. 6 is an end view showing the bolt end, nut and channel of the beam.

Fig. 7 is an end view of the truss rod and channel construction of the beam at its end.

In the accompanying drawings a standard type of wheel truck is utilized to illustrate the application of the invention as now actually in use, the truck embracing the bolster 1, strap hangers 2, 2, for the beam, indicated by the letter B as a whole, the brake heads 3, 3, on the ends of the beam, the shoes 4 4 of the brakes, and the hangers 5, 5, for supporting the brakes.

The component parts of the beam B include the compression member 6 which is a channel iron of proper length, the strut 7 forming the fulcrum post for the brake lever 8 and the tension member 9 in the form of a truss rod, and each of these members is made of the proper and best metal for their purpose.

The simple, but strong and efficient structure, formed of these three parts, it will be noted, is encumbered with a minimum of connecting elements, the strut being fashioned with a comparatively long base plate 10 that is riveted at 11, 11 and bolted at 12 to the flat web 13 of the channel iron compression member 6, and the truss rod forming the tension member passes through the transverse opening 13' near the outer end of the strut, and is held there by the set bolt 14 threaded into the end of the strut as shown particularly in Fig. 3. It will be noted that the strut has a pair of slots 15 and 16, passing there through at the proper angle to each other to accommodate either a left hand brake lever or a right hand brake lever, transverse bolt holes 17 and 18 being provided for the pivot bolts of the levers.

The ends of the truss rod are enveloped by the ends of the channel iron, as indicated specially in Figs. 5 and 7 where it will be seen that the two wings 19 and 20 have been formed by cutting the channel transversely near its ends, to form the wings that are turned around the round truss rod at 21 to provide an incasing sleeve 22 at each end of the beam.

The sleeve forms a journal support for the brake head 3, and it loosely incases the straight portion 21 of the tension member or truss rod, while the cutting of wings 19 and 20 at the ends of the channel iron forms the abrupt or square shoulders 23, 23 at the ends of the channel iron against which shoulders the brake head abuts. Now, by means of the nut 24 on the threaded extremity 25 of the rod ends, and a washer 26 if desired, the truss rod or tension member may be rigidly and compactly brought into close intimacy with the strut and channel iron forming the compression member. Thus by turning the nuts, the washer and sleeve are jammed against the shoulders of the compression member and the truss rod, through its straight ends 21 is drawn through the sleeves 22 until a compact and rigid relationship is established, then the bolt 14 may be turned home in the end of the strut. An additional bracing feature for the beam is constituted by the long base plate 10 of the strut which is riveted and bolted to the compression member and reinforces that member. If desired Babbitt metal may be poured in between the sleeve and the round rod portion 21 to perform the functions of a packing, and when applied over the sleeve and within the brake head the Babbitt metal is efficacious in stopping or preventing undue vibrations thus rendering the joint more durable. In actual use brake beams built according to my present invention have proven highly satisfactory as to their efficiency, strength, durability, and facility in operation and in the process of repair or application of brake levers, and while undergoing the test as to deflection loads and beam tests to ascertain the maximum of its strength, the results have proven the beam to meet all requirements, and in fact to exceed the requirements of the Master Car Builders' standards.

I claim:—

1. A brake beam comprising a compression member and a trussed tension member having its ends fixed to the compression member and adapted to support brake heads, and a strut rigidly connecting the compression member and tension member and fashioned with means to accommodate either a right hand lever or a left hand lever, said strut having a slot in one end to receive said tension member and having a flat base secured to the compression member.

2. A brake beam consisting of a channeled compression member, a strut secured to said member and having a pair of opposite angular lever receiving seats, a truss rod passing at its central portion through the end of said strut and having threaded extremities, sleeves at the ends of the compression members through which the threaded extremities of the rod pass, said compression members having shoulders adjacent to the ends thereof, brake heads on the said sleeves and engaging said shoulders, and nuts engaging the threaded extremities of the rod to jam the heads against the said shoulders.

In testimony whereof I affix my signature.

WILLARD R. CHANDLER.